(12) United States Patent
Rieker et al.

(10) Patent No.: US 12,345,633 B2
(45) Date of Patent: Jul. 1, 2025

(54) OPTICAL SPECTROSCOPY FOR CHARACTERIZING ATMOSPHERIC EMISSIONS

(71) Applicants: LONGPATH TECHNOLOGIES, INC., Boulder, CO (US); THE REGENTS OF THE UNIVERSITY OF COLORADO, A BODY CORPORATE, Denver, CO (US)

(72) Inventors: Gregory B. Rieker, Boulder, CO (US); Robert J. Wright, Boulder, CO (US); Caroline B. Alden, Boulder, CO (US); Sean C. Coburn, Longmont, CO (US); David Wilson, Boulder, CO (US)

(73) Assignees: LONGPATH TECHNOLOGIES, INC.; THE REGENTS OF THE UNIVERSITY OF COLORADO, A BODY CORPORATE

( * ) Notice: Subject to any disclaimer, the term of this patent is extended or adjusted under 35 U.S.C. 154(b) by 0 days.

(21) Appl. No.: 18/847,136

(22) PCT Filed: Mar. 16, 2023

(86) PCT No.: PCT/US2023/015386
§ 371 (c)(1),
(2) Date: Sep. 13, 2024

(87) PCT Pub. No.: WO2023/177801
PCT Pub. Date: Sep. 21, 2023

(65) Prior Publication Data
US 2025/0110047 A1 Apr. 3, 2025

Related U.S. Application Data

(60) Provisional application No. 63/269,414, filed on Mar. 16, 2022.

(51) Int. Cl.
*G01N 21/3504* (2014.01)
*G01J 3/02* (2006.01)
(Continued)

(52) U.S. Cl.
CPC .......... *G01N 21/3504* (2013.01); *G01J 3/021* (2013.01); *G01J 3/42* (2013.01);
(Continued)

(58) Field of Classification Search
CPC ........ G01N 21/3504; G01N 2021/1795; G01J 3/021; G01J 3/42; G01M 3/38; G01V 8/22
(Continued)

(56) References Cited

U.S. PATENT DOCUMENTS 8,654,335 B2 * 2/2014 Hager ................. G01N 21/532
356/438
10,330,593 B1 6/2019 Dobler et al.
(Continued)

OTHER PUBLICATIONS

Hirst, Bill, et al. "Methane emissions: Remote mapping and source quantification using an open-path laser dispersion spectrometer." Geophysical Research Letters 47.10 (2020): e2019GL086725. (Year: 2020).*

(Continued)

*Primary Examiner* — Mohamed K Amara
*Assistant Examiner* — Noah J. Haney
(74) *Attorney, Agent, or Firm* — Cozen O'Connor

(57) ABSTRACT

A method for characterizing gas emissions includes measuring first and second optical beams to generate first and second absorption signals, respectively. Each of the optical beams is transmitted from a center point and retroreflected back to the center point. Paths of the optical beams define boundaries of a sector. Based on the absorption signals, an emission rate of a gas from within the sector is determined.

(Continued)

If the emission rate exceeds a threshold, a third optical beam is measured to generate a third absorption signal. The third optical beam is transmitted from the center point and retroreflected back to the center point. The third optical beam propagates along a path that divides the sector into first and second subsectors. Based on the first, second, and third absorption signals, a location of a source of the gas is identified as being within the first subsector or the second subsector.

19 Claims, 5 Drawing Sheets

(51) Int. Cl.
    *G01J 3/42* (2006.01)
    *G01M 3/38* (2006.01)
    *G01N 21/17* (2006.01)
    *G01V 8/22* (2006.01)

(52) U.S. Cl.
    CPC .............. *G01M 3/38* (2013.01); *G01V 8/22* (2013.01); *G01N 2021/1795* (2013.01)

(58) Field of Classification Search
    USPC ........................................................ 356/437
    See application file for complete search history.

(56) References Cited

U.S. PATENT DOCUMENTS

| | | | |
|---|---|---|---|
| 10,753,864 B2* | 8/2020 | Kasten | G01J 3/30 |
| 10,921,245 B2* | 2/2021 | Bennett | G06T 7/73 |
| 2018/0045596 A1 | 2/2018 | Prasad et al. | |
| 2018/0266944 A1 | 9/2018 | Waxman et al. | |
| 2021/0223169 A1 | 7/2021 | Waxman et al. | |
| 2023/0280270 A1* | 9/2023 | Myrick | G01N 33/0027 356/326 |

OTHER PUBLICATIONS

International Search Report and Written Opinion in corresponding International Patent Application No. PCT/US2023/015386, mailed Jul. 12, 2023, 6 pages.

Alden et al. "Temporal Variability of Emissions Revealed by Continuous, Long-Term Monitoring of an Underground Natural Gas Storage Facility" 14589-14597. Environmental Science Technology. Web. Oct. 27, 2020; URL: https://www.osti.gov/pages/servlets/purl/1688445 see entire document.

Coburn et al. "Regional Trace-Gas Source Attribution Using a Field-Deployed Dual Frequency Comb Spectrometer" 320-327. Optica. Web. Mar. 22, 2018; URL: https://opg .optica .org/directpdfaccess/2a2a276-4eeb-4085-bcd4151 f51 b32a51_383923/optica-5-4-320.pdf?da=1&id=383923&seq=0&mobile=no; see entire document.

Rieker et al. "Frequency-Comb-Based Remote Sensing of Greenhouse Gases Over Kilometer Air Paths" 290-298. Optica. Web. Oct. 29, 2014; URL: https ://opg. optica. org/d irectpdfaccess/56c0b5d 0-4 f31-44 f5-9e3a504bec3227Sf_ 303517 /optica-1-5-290.pdf?da=1&id=303517&seq=0&mobile=no; see entire document.

Alden et al .. "Bootstrap Inversion Technique for Atmospheric Trace Gas Source Detection and Quantification Using Long Open-Path Laser Measurements" 1565-1582. Atmospheric Measurement Techniqu_ es. Web. Mar. 22, 2018; URL: https://amt.copernicus.org/articles/11/1565/2018/amt-11-1565-2018.pdf; see entire document.

Waxman et al.. "Intercomparison of Open-Path Trace Gas Measurements with Two Dual Frequency Comb Spectrometers" 3295-3311. Atmospheric Measurement Technology. Web. Sep. 11, 2017; URL: https://www.ncbi.nlm.nih.gov/pmc/articles/PMC5740489/; see entire document.

* cited by examiner

OPTICAL SPECTROSCOPY FOR CHARACTERIZING ATMOSPHERIC EMISSIONS

RELATED APPLICATIONS

This application claims priority to U.S. Provisional Patent Application No. 63/269,414, filed on Mar. 16, 2022, the entirety of which is incorporated herein by reference.

STATEMENT REGARDING FEDERALLY SPONSORED RESEARCH OR DEVELOPMENT

This invention was made with government support under grant numbers DE-AR0001454 and DE-SC0021870, awarded by the U.S. Department of Energy. The government has certain rights in the invention.

BACKGROUND

A number of scientific and industrial fields require more accurate, rapid, and continuous monitoring of airborne constituents with environmental, chemical, biological, and health-and-safety impacts. For example, recent increases in natural gas production in the United States have led to a parallel increase in attention from researchers, policy-makers and industry on methane and volatile organic compound emissions from this sector and the efficacy of current mitigation activities. Past measurements of methane emissions from the oil and gas sector suggest a so-called "fat-tailed" distribution: a few large, and possibly intermittent sources account for a large proportion of total emissions. Approaches to monitoring that are continuous in time and regional in coverage are therefore critically important for detection and mitigation of the biggest emitters. Current leak detection and repair (LDAR) practices, however, consist of "snapshots" in time of emissions using an infrared camera, a practice that is known to have high levels of uncertainty, is not amenable to continuous monitoring, and cannot itself yield estimates of leak rates. These findings have led to efforts to create new technologies, particularly with continuous monitoring capabilities, for detection and mitigation of emissions from oil and gas production, distribution and storage.

SUMMARY

The present embodiments include methods for using an optical gas detector to characterize emissions from one or more potential or known gas sources. Specifically, optical beams (e.g., laser beams or incoherent light beams) propagate along various paths, after which they are detected to obtain path-integrated absorption signals. The resulting absorption signals may be combined with position information, environmental information (e.g., wind speed and direction, temperature, etc.), and other measurements (e.g., gas measurements performed with other instruments) to perform data analysis that determines information about the emissions. For example, an inversion may be used to obtain background concentrations, gas source locations (e.g., center coordinates or constrained areas), identified species, plume parameters (e.g., mass, diffusivities, etc.), or a combination thereof. Without departing from the scope hereof, this data analysis may be used to determine additional or alternative information that characterizes the emissions.

Many of the present embodiments use retroreflected optical beams, which advantageously allows an optical beam to be detected at a location near where it is transmitted. Co-locating the apparatus for generating, transmitting, and detecting an optical beam (or multiple optical beams) allows sharing of equipment, which reduces cost and size of the optical gas detector. This approach also simplifies setup by allowing most of the equipment to be installed in a vehicle (e.g., a truck) that can be easily moved to different locations.

Several of the present embodiments implement techniques that are referred to herein as "sub-pad localization." A "pad" is a monitored area containing one or more pieces of equipment, any one or more of which may be an emission source (e.g., gas leak). A "sub-pad" is a monitored area that is only a portion of a pad. For example, a sub-pad may be an area of a pad that encompasses only one piece of equipment. The term "sub-pad localization" refers to techniques that help determine which portion of a pad is the location of an emission source. Sub-pad localization essentially improves the spatial resolution with which the optical gas detector can determine the location of a gas leak.

In practice, a pad typically contains several pieces of equipment that can leak. Determining which piece of equipment is leaking (as opposed to whether or not the entire pad contains a gas leak) beneficially reduces how much equipment need to be tested and fixed during follow-up investigation. The present embodiments therefore speed up identification and repair of gas-leak sources, as compared to embodiments without sub-pad localization.

DETAILED DESCRIPTION

Figure 1:
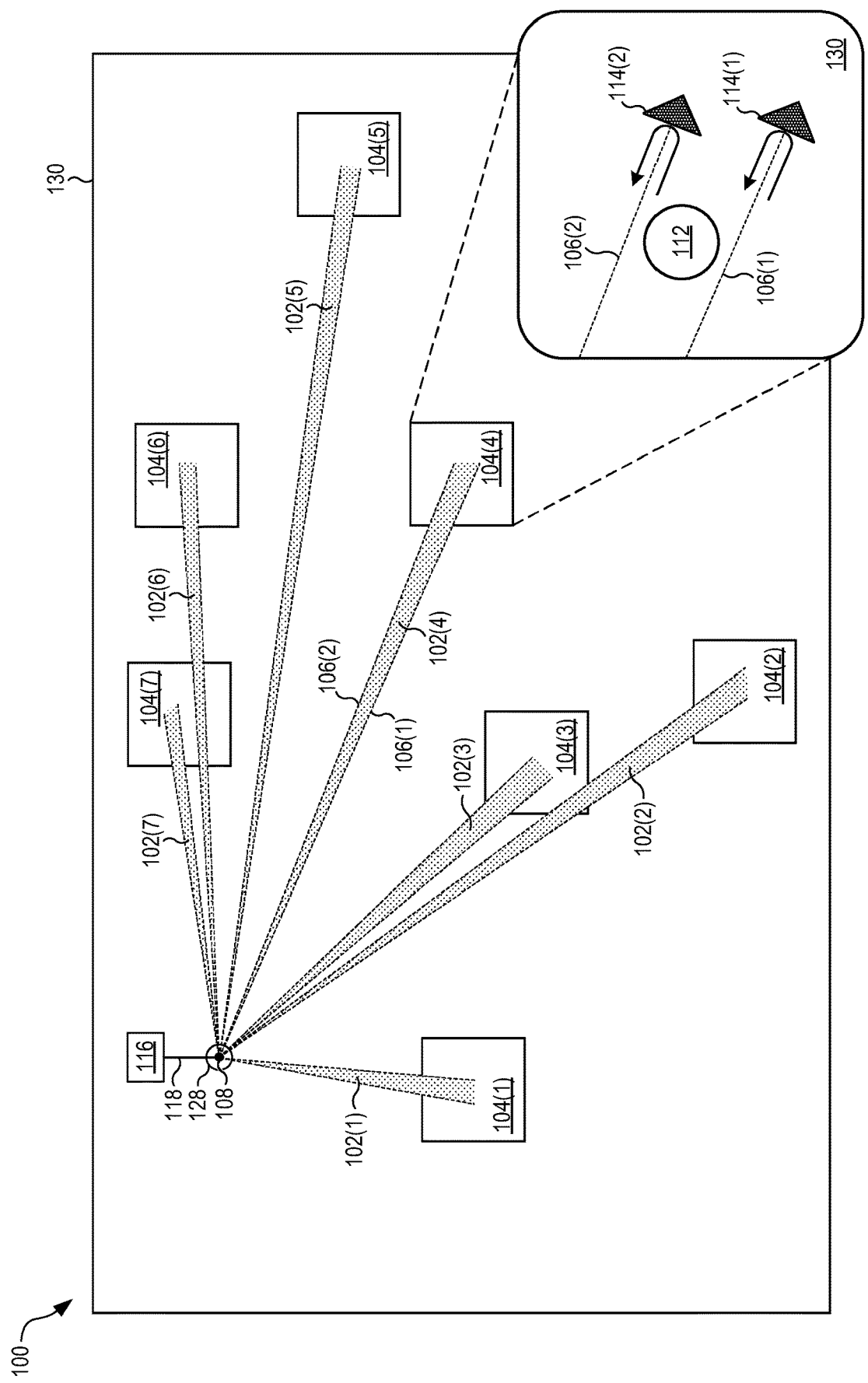
FIG. 1 shows a top view of an optical gas detector being used to remotely measure gases within a geographic area.

FIG. 1 is a top view of an optical gas detector 100 being used to remotely measure gases within a geographic area 130. The gas detector 100 includes a spectrometer 116 that generates an optical beam and measures gas species via absorption of the optical beam after it is transmitted from, and reflected back toward, a geographic center point 108 of the area 130. To transmit the optical beam in various directions, the gas detector 100 may include a gimbal mount 128 located at the center point 108. In FIG. 1, the spectrometer 116 outputs light into a fiber-optic cable 118 that guides the light to the gimbal mount 128. Optics affixed to the gimbal mount 128 then couple the light into a free-space optical beam. Alternatively, all or part of the spectrometer 116 may be mounted directly to the gimbal mount 128.

The spectrometer 116 may be a dual-frequency-comb spectrometer, a single-frequency laser spectrometer (e.g., tunable-diode laser absorption spectroscopy), or another type of laser spectrometer used to measure gas species via absorption of laser light. In these embodiments, the optical beam is a beam of coherent light (e.g., a laser beam). In other embodiments, the spectrometer 116 generates and detects an optical beam of incoherent light. Examples of gas species that may be measured by the gas detector 100 include, but are not limited to, methane, acetylene, carbon dioxide, water vapor, carbon monoxide, hydrogen sulfide, ethylene, ethane, propane, butane, and BTEX (benzene, toluene, ethylbenzene, and xylene). The geographic area may cover several square kilometers, or more, i.e., the optical beam may propagate for several kilometers before being reflected back to the center point 108.

In FIG. 1, the gimbal mount 128 steers the optical beam to measure gases within seven sectors 102(1) . . . 102(7) that spatially overlap seven respective pads 104(1) . . . 104(7). Each of the pads 104(1) . . . 104(7) may be, for example, a natural gas pad, well pad, drilling pad, or region of a facility that uses gas-handling equipment. As shown in a detailed view 130 of a fourth pad 104(4), a first laser beam is transmitted from the center point 108 to a first retroreflector 114(1) placed within, or near, the fourth pad 104(4). Alternatively, light may be reflected and return to center point 108 after scattering off of elements of the environment or other materials. The first laser beam, after retroreflection, returns to the center point 108, where it is detected by the laser spectrometer 116 to generate a first absorption signal. The first laser beam, both before and after retroreflection, propagates along a first path 106(1).

A second laser beam is transmitted from the center point 108 to a second retroreflector 114(2) (or another scattering surface) placed within, or near, the fourth pad 104(4). The second laser beam, after retroreflection, returns to the center point 108, where it is also detected by the laser spectrometer 116 to generate a second absorption signal. The second laser beam, both before and after retroreflection, propagates along a second path 106(2). The paths 106(1) and 106(2) define boundaries of the sector 102(4). Specifically, the paths 106(1) and 106(2) intersect at the center point 108, forming a center angle less than 180° (i.e., the sector 102(4) is a minor circular sector). The sector 102(4) is an example of what is referred to herein as a "monitored area." While the retroreflectors 114(1) and 114(2) are shown in FIG. 1 as corner-cube retroreflectors, the retroreflectors 114(1) and 114(2) may be another type of retroreflector known in the art (e.g., cat's eye or planar mirror).

The first and second absorption signals may be processed to determine any kind of emission information that characterizes actual or potential gas emission within the sector 102(4). One example of this emission information is a concentration level of each of one or more species of gas within or near the sector 102(4). Another example is an emission rate of each of the one or more gas species. Emission information also includes a binary determination of the presence of gas emission within the sector 102(4). This binary determination may be made, for example, by first determining a probability that there is a gas source located within the sector 102(4). This probability may then be compared to a threshold. If the probability exceeds the threshold, the gas detector 100 indicates the presence of non-negligible gas emissions within the sector 102(4). Based on the locations of the paths 106(1) and 106(2) and the retroreflectors 114(1) and 114(2), the location of the gas source may be further attributable to a location within or near the fourth pad 104(4).

In FIG. 1, the paths 106(1) and 106(2) lie on opposite sides of a piece of equipment 112 located within, or near, the pad 104(4). The equipment 112 may be an oil well, pump, storage tank, or other item that could emit or leak gas. The equipment 112 is therefore one example of a candidate emission source, or source of gas emitted into the atmosphere. Under different wind conditions, the emitted gas will flow disproportionately through the first and second laser beams. For example, for certain wind properties (i.e., speeds and directions) the emitted gas will flow across one of the two paths 106(1) and 106(2), where it will affect absorption of the corresponding laser beam (e.g., see FIGS. 3A and 4A). This one path is also referred to herein as the downwind path. The laser beam propagating along this path is also be referred to herein as the downwind laser beam.

An absorption signal obtained from the downwind laser beam will show absorption features that are characteristic of one or more species present in the gas. Advantageously, an absorption signal obtained form the other of the two laser beams can be processed to determine a background concentration of the one or more species. This other laser beam is also referred to herein as the upwind laser beam and the path along which it propagates is referred to herein as the upwind path. The first and second absorption signals can be combined to improve the accuracy with which gas detected by the downwind laser beam can be attributed to originating at the equipment 112. Any disproportionate signature imposed on the two beams by the emitted gas can be used to understand emissions from equipment (e.g., equipment 112) near or outside this monitored area.

Still referring to the fourth pad 104(4), the paths 106(1) and 106(2) define two boundaries of the sector 102(4), which originates at the center point 108. When the retroreflectors 114(1) and 114(2) (or other scattering surfaces) are located within, or near, the fourth pad 104(4), the sector 102(4) at least partially overlaps the fourth pad 104(4). The retroreflectors 114(1) and 114(2) (or other scattering surfaces) may be positioned differently than shown in the detailed view 130, and any one or more of the pads 104 may include more than one piece of equipment 112 (i.e., more than one candidate emission sources). Equipment or pipelines outside of the pad may also be candidate emission sources that are monitored.

The above description applies to all seven of the pads 104 shown in FIG. 1. Accordingly, FIG. 1 shows seven corresponding sectors 102, all originating at the center point 108. The pads 104 may be located anywhere around the center point (i.e., in all 360 degrees). The central angles of the sectors 102 may be the same or different. While the example of FIG. 1 shows seven pads 104(1) . . . 104(7), the optical gas detector 100 may operate with a different number of sectors 102 and pads 104 without departing from the scope hereof. It should also be understood that the locations of the sectors 102 around the center point 108, as shown in FIG. 1, are exemplary; in practice, the sectors 102 may be arranged differently, relative to the center point 108, without departing from the scope hereof.

When the spectrometer 116 can transmit and detect only one laser beam at a time, a first absorption measurement performed with the first laser beam precedes a second absorption measurement performed with the second laser beam. Specifically, the gas detector 100 may control the gimbal mount 128 to steer the first laser beam at a first angle (e.g., relative to a reference direction, such as geodetic north or grid north) such that the first laser beam propagates along a first sector boundary (e.g., the first path 106(1)). The gas detector 100 may then control the gimbal mount 128 to steer the second laser beam at a second angle, different from the first angle, such that the second laser beam propagates along a second sector boundary (e.g., the second path 106(2)). When the spectrometer 116 can transmit and detect two or more laser beams simultaneously (e.g., two single-beam laser spectrometers operating in parallel), the gas detector 100 can measure the first and second absorption signals by simultaneously transmitting the first laser beam at the first angle and the second laser beam at the second angle, and simultaneously detecting the first and second laser beams after retroreflection.

Figure 2:
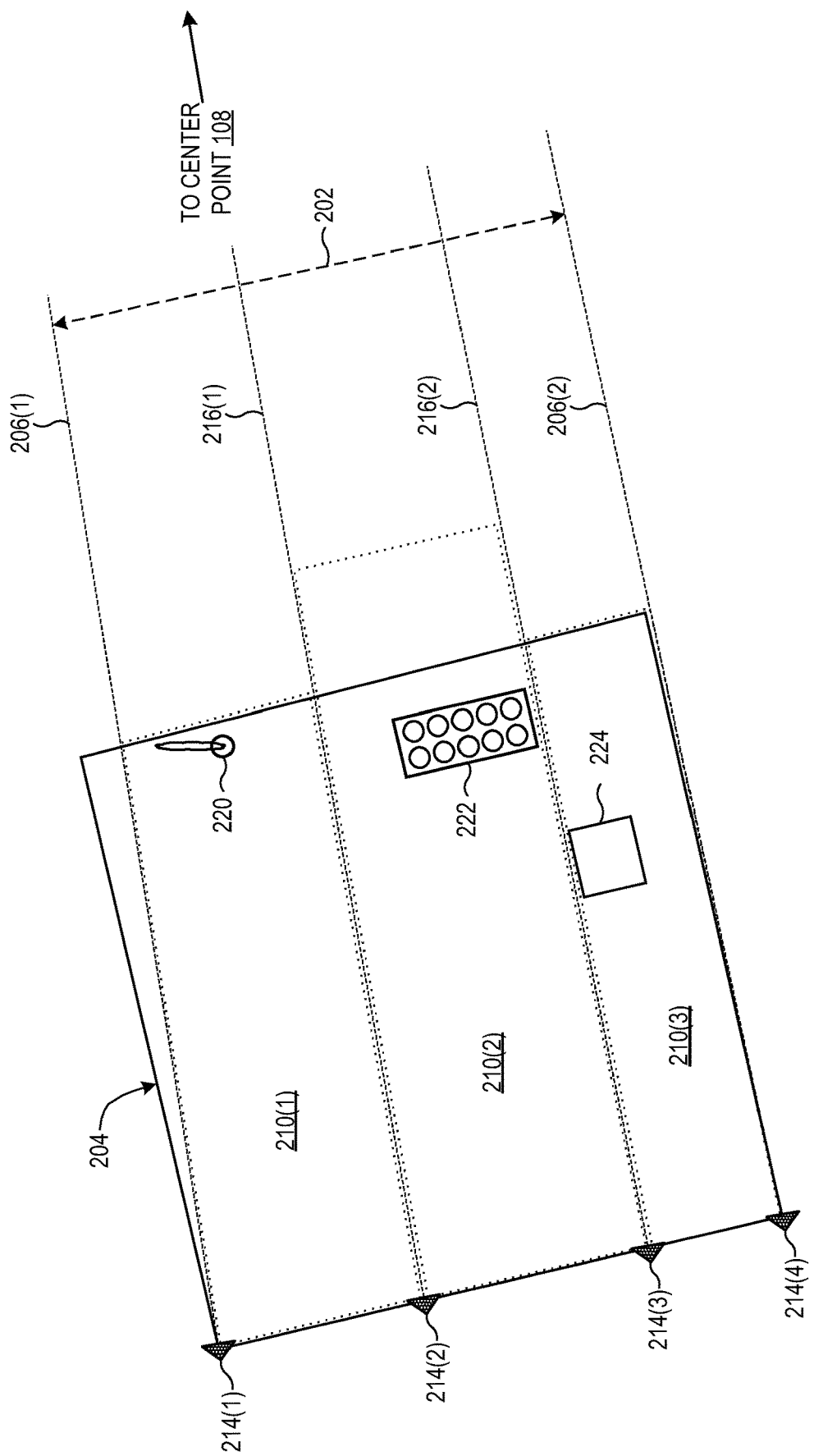
FIG. 2 illustrates the optical gas detector of FIG. 1 performing sub-pad localization, in embodiments.

FIG. 2 illustrates the optical gas detector 100 of FIG. 1 performing sub-pad localization of a pad 204. While the term "pad" refers to a monitored area containing a collection of equipment, a "sub-pad" is a monitored area that is only a portion of a pad (e.g., an area containing only one piece of equipment). Herein, the term "localization" means identification of the location of an emission source. Similarly, the term "sub-pad localization" refers to techniques used to determine which of a pad's sub-pads is the location of an emission source. Sub-pad localization essentially improves the spatial resolution with which the optical gas detector 100 can determine the location of a gas leak.

In FIG. 2, a first optical beam is transmitted from the center point 108 toward a first retroreflector 214(1) that retroreflects the first optical beam back to the center point 108. This first optical beam propagates along a first path 206(1) that defines a first boundary of a sector 202. A second optical beam is transmitted from the center point toward a second retroreflector 214(2) that retroreflects the second optical beam back to the center point 108. This second optical beam propagates along a second path 206(2) that defines a second boundary of the sector 202. The pad 204 lies almost entirely between the paths 206(1) and 206(2) and therefore is located almost entirely within the sector 202. The sector 202 is an example of the sectors 102 of FIG. 1, the pad 204 is an example of the pads 104 of FIG. 1, and the paths 206(1) and 206(2) are examples of the paths 106(1) and 106(2), respectively, of FIG. 1.

The spectrometer 116 processes the first and second optical beams, after retroreflection, to measure first and second absorption signals, respectively. The optical gas detector 100 then processes the first and second absorption signals to determine a sector emission rate of a gas species from within the sector 202. If the sector emission rate is sufficiently high (e.g., above a pre-determined threshold), then the gas detector 100 assumes that there is a leak of the gas species originating from within the sector 202. The gas detector 100, in response to the high sector emission rate, then automatically begins sub-pad localization.

In sub-pad localization, the sector 202 is divided into a plurality of n subsectors, where n is any integer greater than or equal to 2. In the example of FIG. 2, where n=3, the sector 202 is divided into a first subsector 210(1), a second subsector 210(2), and a third subsector 210(3). However, the sector 202 may be divided into a different number of subsectors (e.g., n=2, 3, 4, etc.) without departing from the scope hereof. Subsectors are defined by intrasector optical beams that propagate from the center point 108 toward a plurality of intrasector retroreflectors that retroreflect the intrasector optical beams back toward the center point 108 for measurement and processing (e.g., with the spectrometer 116). Both the number of intrasector optical beams and the number of intrasector retroreflectors may equal n−1.

In the example of FIG. 2, a first intrasector optical beam is transmitted from the center point 108 toward a first intrasector retroreflector 214(1) that retroreflects the first intrasector optical beam back to the center point 108. This first intrasector optical beam propagates along a first intrasector path 216(1) that defines a boundary of both the first subsector 210(1) and the second subsector 210(2). A second intrasector optical beam is transmitted from the center point 108 toward a second intrasector retroreflector 214(2) that retroreflects the second intrasector optical beam back to the center point 108. This second intrasector optical beam propagates along a second intrasector path 216(2) that defines a boundary of both the second subsector 210(2) and the third subsector 210(3). Thus, the first subsector 210(1) is bounded by the optical paths 206(1) and 216(1), the second subsector 210(2) is bounded by the intrasector optical paths 216(1) and 216(2), and the third subsector 210(3) is bounded by the optical paths 216(2) and 206(2).

The locations of the intrasector paths 216 (and therefore the intrasector retroreflectors 214) are chosen such that each subsector contains one piece of equipment. The pad 204, as a whole, is shown in FIG. 4 with three pieces of equipment: a flare 220 located within the first subsector 210(1), an array of storage tanks 222 located within the second subsector 210(2), and separators 224 located within the third subsector 210(3). In general, a pad may contain more or fewer than three pieces of equipment. In some cases it is not possible to divide the pad 204 such that each subsector 210 contains only one piece of equipment. This may occur, for example, when multiple pieces of equipment are close enough to each other that there is no line-of-sight path from the center point 108 that separates the equipment. In these cases, one or more of the subsectors 210 may contain more than one piece of equipment.

The spectrometer 116 processes each of the intrasector optical beams, after retroreflection, to measure a corresponding intrasector absorption signal. The intrasector optical beams may be transmitted and received one-at-a-time or sequentially, depending on how many optical beams the optical gas detector 100 can process simultaneously. The gas detector 100 processes the first, second, and intrasector absorption signals to identify a gas source (either potential or known) within at least one of the subsectors 210. For example, the gas detector 100 may determine a subsector emission rate for each of the subsectors 210 and then compare these subsector emission rates to identify which of the subsectors 210 has the highest emission rate or probability of containing a gas leak. More details about how the absorption signals may be processed are presented below in the section titled "Sub-Pad Localization Techniques."

Sub-pad localization may continue for as long as the sector emission rate exceeds the threshold. Specifically, the optical gas detector 100 may repeat measurements and processing of the first, second, and intrasector absorption signals and identify, based on these repeated measurements, a gas source within at least one of the subsectors 210. In some embodiments, sub-pad localization stops when the sector emission rate returns to a level below the threshold. In these embodiments, the optical gas detector 100 allocates some, if not all, of its resources towards monitoring the sector 204, as opposed to other sectors. During sub-pad localization, the sector emission rate may be determined solely from the first and second absorption signals (i.e., like that used to initiate sub-pad localization) or by summing the subsector emission rates of all the subsectors 210. In other embodiments, sub-pad localization continues for a fixed duration, as measured from the time it is initiated.

In some embodiments, sub-pad localization of the pad 204 continues for a fixed duration, after which the optical gas detector 100 temporarily switches to monitoring a different sector 104. After obtaining a measurement of the different sector 104, the optical gas detector 100 returns to monitoring and sub-pad localization of the pad 204. These embodiments may be useful for when the sector 104 maintains high emissions for extended periods of time (e.g., several hours or days). In such circumstances, the optical gas detector 100 is still primarily utilized to monitor the sector 104 but occasionally "checks" on the other sectors 104 to ensure that the other sectors 104 show no signs of leaking.

For clarity herein, many of the present embodiments are described in terms of laser beams and laser-based spectrometers. However, any of the present embodiments may be implemented using any type of optical beam known in the art. The term "optical beam" is used herein to refer to any type of collimated or near-collimated light, either coherent or incoherent, that can be used for absorption spectroscopy. In any embodiment using an optical beam that is incoherent, the incoherent optical beam may be generated from any incoherent light source known in the art (e.g., a lamp, light-emitting diode, discharge tube, etc.) and collimated using known optical components and beam-forming techniques (e.g., lenses). Alternatively, the incoherent light beam may be generated by collimating sunlight. In this case, absorption of the sunlight may be detected using a laser heterodyne radiometer, which is one example of an optical spectrometer. Another type of optical spectrometer may be used with any of the present embodiments without departing from the scope hereof.

Sub-Pad Localization Techniques

An important feature of the monitoring performed by the optical gas detector 100 is localization of emission sources once they are detected. Localization can be at the site level (e.g., the pad 204), the equipment group level (e.g., the array of storage tanks 222), the equipment level, or the component level. The sub-pad localization described above is one type of localization. The following techniques and methods are non-limiting examples of how the optical gas detector 100 may perform localization.

Super-Sector Method: An inversion is applied to concentration values (more specifically enhancement values) across one or more optical beams to solve for all emission points in the monitored area. In particular, multiple sub-pads on a single pad may be used in a single inversion for emission rates on each of those different sub-pads. Emission rates can be solved using any inversion routine. Examples of such routines include, but are not limited to, non-negative least squares, Bayesian methods, and Markov-chain methods (e.g., the Metropolis-Hastings method). Different areas of the pad, or "sub-pads," can be ranked for likelihood of the emission location by, for example, ranking each area by the cumulative leak rate of all priors (i.e., all possible emission points) within the sub-pad. The super-sector method can also be used to estimate emissions from multiple different pads simultaneously.

Sub-Pad Level Method—Emissions are solved for one sub-pad at a time. Only the priors from a given sub-pad or sub-area of the monitored area (for example, equipment group or equipment) are considered. Typically, only the optical beams directly bounding the monitored sub-pad are used in the inversion for the emission rate for that sub-pad. Different areas of the pad (sub-pads) can be ranked for likelihood of the emission location, for example, according to the residual between the model-fit data and actual measured data. Sub-pads with a better model-fit (i.e., lower residual) can, in this way, be ranked as more likely to be leaking.

Prior-Level Method—Emissions are solved for one prior at a time. A "prior" refers herein to a single location, such as one piece of equipment, grouping of equipment group, or area of the pad. In the prior-level method, only one potential emission point is used as input. That is, the emission rate is solved as if that source were the only potential source. After emission rates for the priors have been estimated, the sub-pads (each containing one or more priors) are ranked based on model-fit residual. The sub-pad with the prior having the lowest residual is ranked as the most likely emitter, the sub-pad with the next lowest residual is ranked as the second most likely emitter, and so on.

Bayesian Methods—Emission rates and uncertainty distributions are solved with assumed prior and measurement noise distributions. Sub-pad rankings are then calculated using the resulting posterior uncertainty distribution to obtain the probability that each sub-pad is leaking above a certain threshold.

Metropolis-Hastings Method—An emission rate and location (also referred to as a "particle") is randomly sampled from a prior statistical distribution. The prior distribution is chosen to reflect the actual distribution of emission rates from a pad. For example, a log-normal distribution has been shown to be a good approximation, where most leaks are small, with the rarer super-emitter event.

The data likelihood is then calculated for the particle. Here, likelihood means the probability that the data for a particle would cause or explain the observed measurements. For example, when a high methane concentration is measured for a particular optical beam, particles with high emission rates in close proximity to that optical beam will generally have higher likelihoods. To calculate likelihood, it is assumed that the concentration measurement noise is Gaussian, zero-mean with known variance. The particle is then fed into a model that uses atmospheric data (e.g., wind direction, speed, and turbulence parameters) to estimate how much the leak would enhance the concentration measurement. This enhanced concentration value is then fed into the probability density function of the measurement distribution to obtain the probability.

The new particle is then accepted or rejected according to the ratio of its probability with that of the previous particle. If the probability is greater than that of the previous particle, the new particle is accepted and added to the posterior sample. If the probability is less than that of the previous particle, then a uniformly distributed random number between 0 and 1 is generated. If the ratio of probabilities is greater than this random number, the new particle is accepted and added to the posterior sample. If not, the new particle is rejected and the previous particle is added to the posterior sample.

The surviving particles (i.e., the posterior sample) are a good approximation for the posterior distribution of the true leak (both rate and location). Emission rates and location ranges that are more likely are represented with more particles, and vice versa. Sub-pads with more particles having non-negligible leak rates are more likely to be the source of emissions. Thus, sub-pads are ranked according to the number of particles.

Plume Meander

A line-integrated measurement of atmospheric parameters, such as gas mole fraction (i.e., concentration), can provide information about the atmosphere that is helpful for determining information about the location, size, and nature of an emission source as well as atmospheric conditions related to pollutant (constituent) dispersion. For example, plume meander may lead to measurable and predictable (parameterizable) changes in the concentration signature on the downwind beam through time. The characteristics of plume meander (e.g., amplitude, frequency) could be used to understand source characteristics, atmospheric characteristics, or both.

Figure 3A:
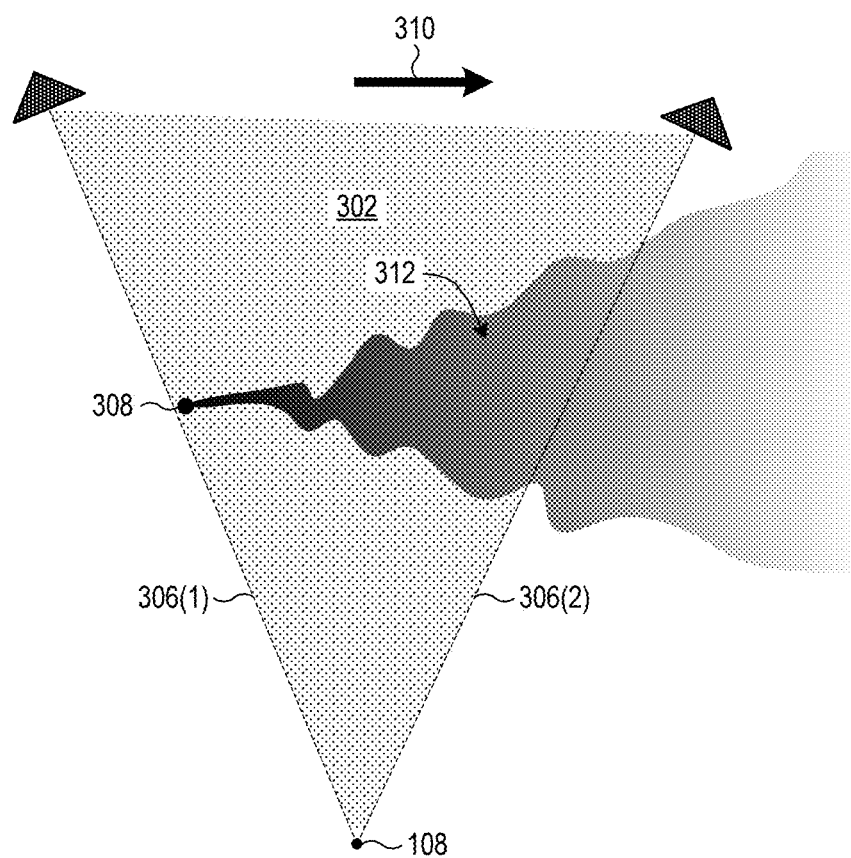
FIG. 3A illustrates meander of a plume through a sector.
Figure 3B:
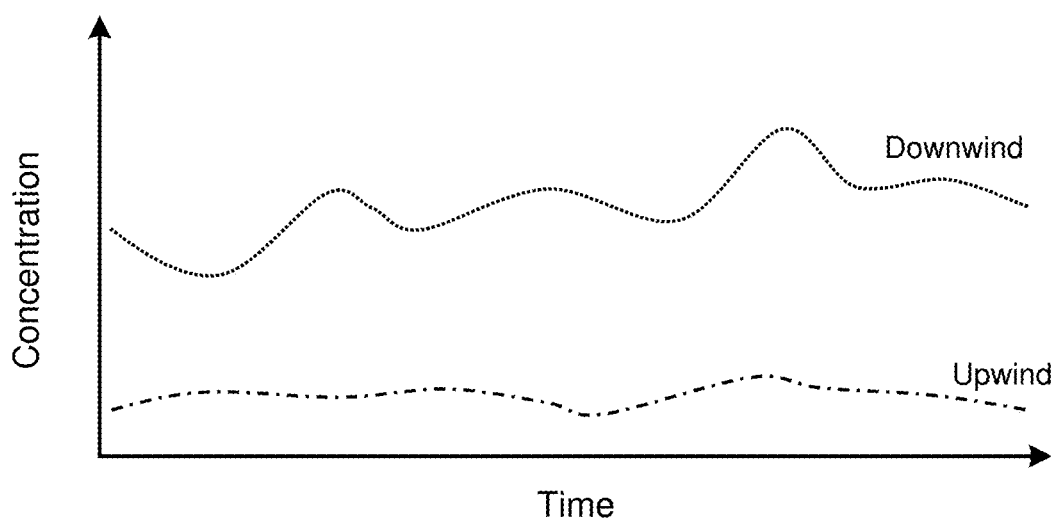
FIG. 3B illustrates how variability of wind speed and direction affects downwind concentration of the plume in FIG. 3A.

FIG. 3A illustrates meander of a plume 312 through a sector 302 that is bounded by a first path 306(1) and a second path 306(2). The sector 302 is an example of the sector 202 in FIG. 2 and the sectors 102 in FIG. 1. The paths 306(1) and 306(2) are examples of the paths 106(1) and 106(2) of FIG. 1 and the paths 206(1) and 206(2) of FIG. 2. The plume 312 originates at an emission source 308 that is located closer to the first path 306(1) than the second path 306(2). In FIG. 3A, wind speed is primarily to the right (i.e., from the first path 306(1) toward the second path 306(2)), as indicated by a wind vector 310. Due to this general wind direction, the plume 312 does not cross the first path 306(1) and therefore will not affect any line-integrated concentration measured along the first path 306(2). On the other hand, the plume 312 crosses the second path 306(2) and therefore will affect any line-integrated concentration measured along the second path 306(2). The paths 306(1) are 306(2) are also referred to as the upwind and downwind paths, respectively. Similarly, a line-integrated concentration measured along the first path 306(1) is also referred to as an upwind concentration while a line-integrated concentration measured along the second path 306(2) is also referred to as a downwind concentration. FIG. 3B illustrates how variability of the wind speed and direction, in conjunction with dispersion of the plume 312, affects the downwind concentration.

Figure 4A:
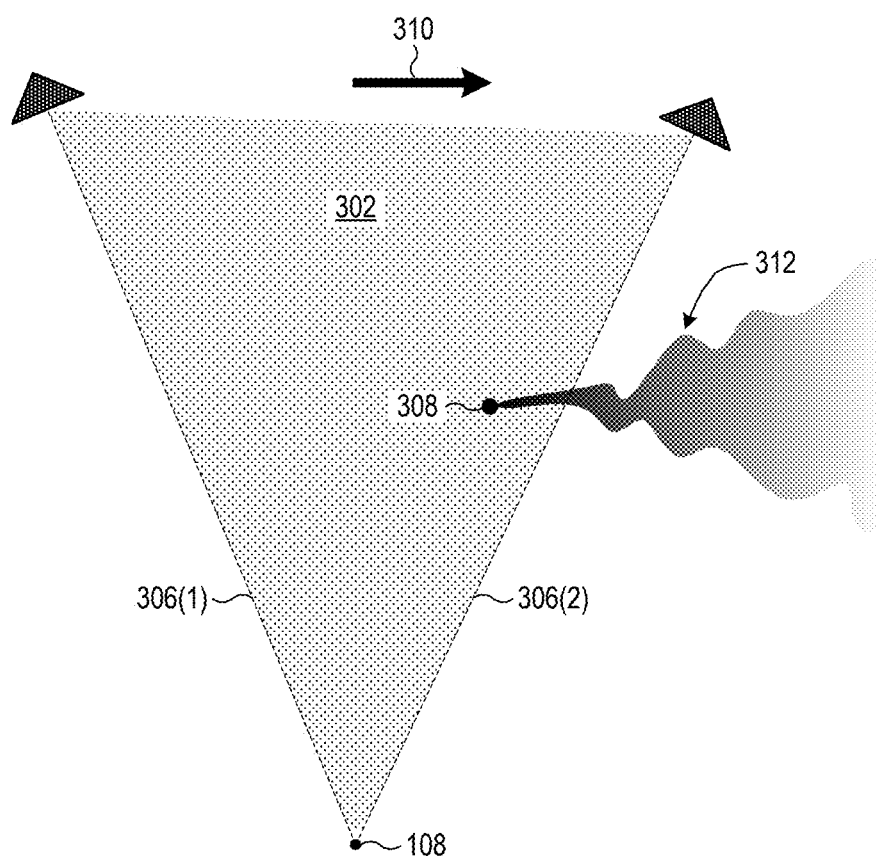
FIG. 4A is similar to FIG. 3A except that the emission source is located closer to a downwind path than an upwind path.
Figure 4B:
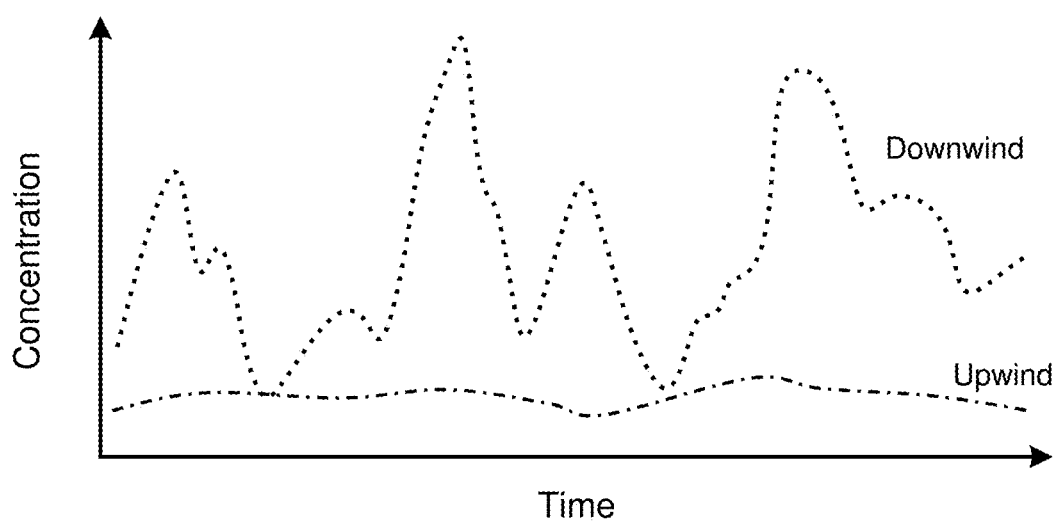
FIG. 4B illustrates how variability of the wind speed and direction affects the downwind concentration for the situation depicted in FIG. 4A.

FIG. 4A is similar to FIG. 3A except that the emission source 308 is located closer to the second path 306(2) than the first path 306(1). In this case, the variability of wind speed and direction has a greater effect on how the plume 312 crosses the second path 306(2) since the plume 312 has had less time to diffuse and grow in size. FIG. 4B illustrates how variability of the wind speed and direction affects the downwind concentration for the situation depicted in FIG. 4A. Here, the variability causes much larger fluctuations, as compared to FIG. 3B, since the plume 312 has not had as much time and space to disperse. In fact, at some times, the plume 312 is blown above or below the second path 306(2), causing the plume 312 to miss the optical beam; this effect results in the downwind concentration being reduced to the point where it is equal to, or near, the upwind concentration (i.e., the background concentration).

Figure 5:
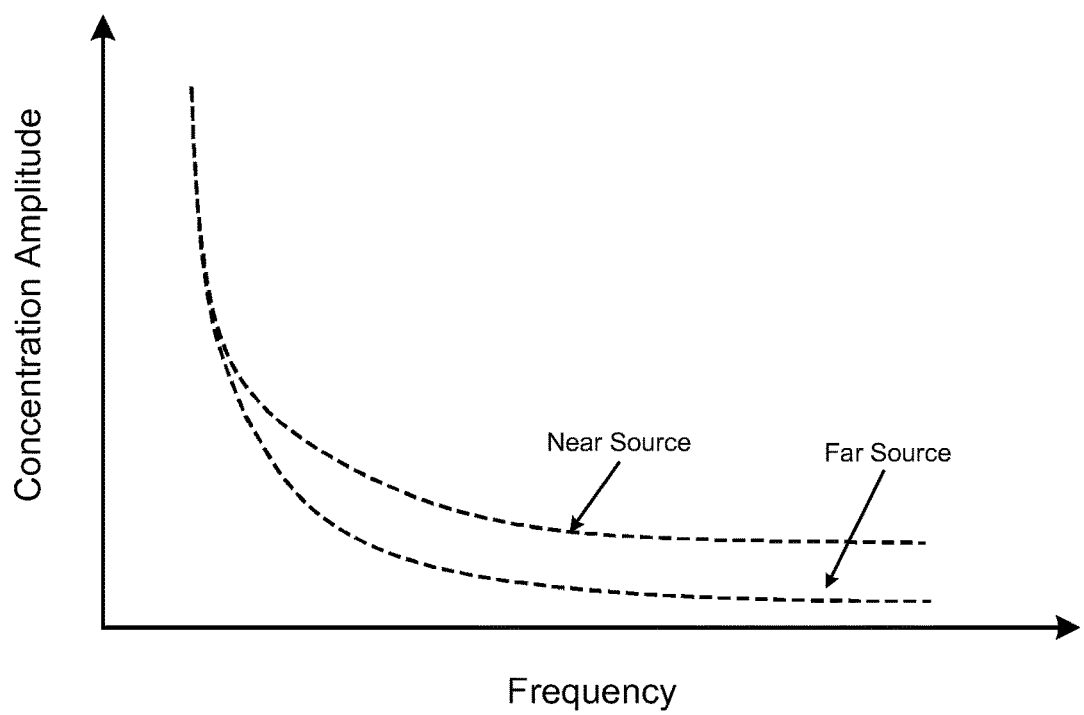
FIG. 5 shows how the amplitude of the downwind concentration varies with frequency for the "far-source" situation depicted in FIG. 3A and the "near-source" situation depicted in FIG. 4A.

FIG. 5 shows how the amplitude of the downwind concentration varies with frequency for the "far-source" situation depicted in FIG. 3A and the "near-source" situation depicted in FIG. 4A. The data in FIG. 5 may be obtained, for example, by calculating the Fourier transform of the concentration time series shown in FIGS. 3B and 4B. Some plume models use an averaging time of several minutes (e.g., 10 min) to establish an approximation of the distribution of the plume's location (and therefore concentration profile) over the averaging time. Over long averaging times (i.e., small frequencies), the far-source and near-source scenarios average out to similar amplitudes. But on shorter timescales (i.e., higher frequencies), the near-source situation results in larger amplitudes than the far-source situation. This difference in high-frequency amplitudes can be used as an additional source of information that can be fed into any of these models to statistically weight the different outcomes.

In embodiments, the optical gas detector 100 uses characteristics of a line-integrated concentration time series to determine or constrain the location of the emission source 308 between the paths 306(1) and 306(2). For example, the optical gas detector 100 may calculate the Fourier transform of the concentration time series to obtain a spectrum. The optical gas detector 100 may then process the spectrum to determine whether the emission source 308 is located closer to the upwind path or the downwind path. This determination may include a quantitative estimate of how far the emission source 308 is from the upwind path, the downwind path, or both. The optical gas detector 100 may use atmospheric data (e.g., wind direction and speed) as part of the determination. As an alternative to Fourier transformation, the optical gas detector 100 may apply a different signal-processing or statistical technique to the concentration time series to determine its variability. Examples include, but are not limited to, moving averaging, moving standard deviations, and autocorrelations.

Figure 6:
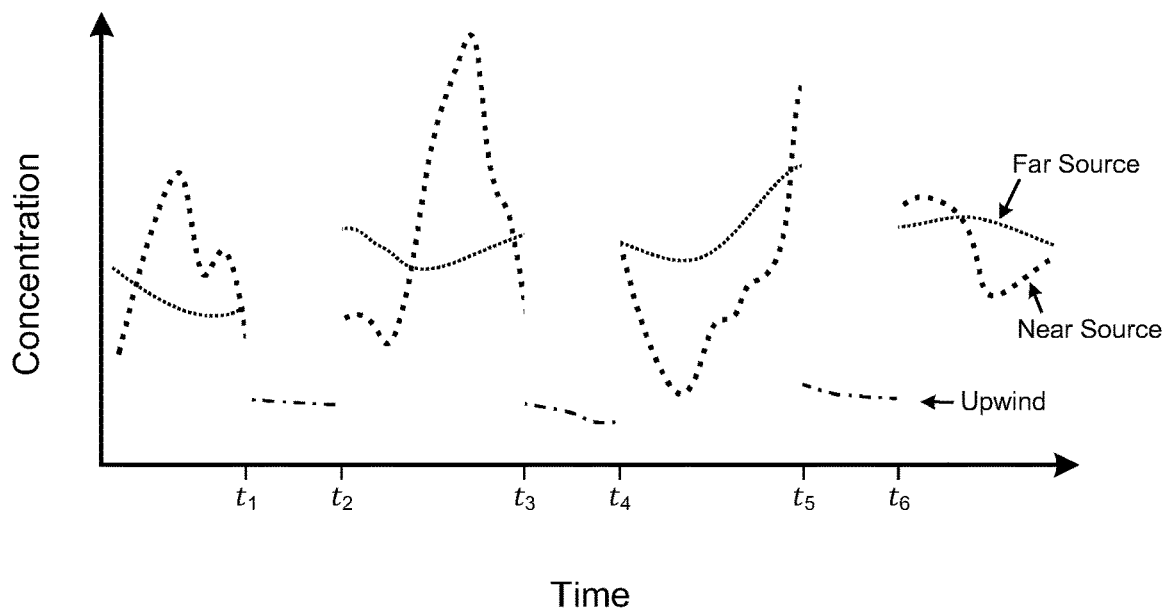
FIG. 6 illustrates how the time series of FIGS. 3B and 4B appear when the optical gas detector of FIG. 1 alternates between upwind and downwind measurements.

FIG. 6 illustrates how the time series of FIGS. 3B and 4B appear when the optical gas detector 100 alternates between upwind and downwind measurements. Breaks in the near-source and far-source time series have little impact on the ability of the optical gas detector 100 to determine the location of the emission source 308 relative to the paths 306(1) and 306(2). Specifically, high-frequency variability of the downwind beam can still be observed and used to discriminate between the far-source situation of FIG. 3A and the near-source situation of FIG. 3B.

In other embodiments, atmospheric dynamics are determined using measurements of the plume 312. Dispersion parameters, for example, are based on expected behavior of plume meander. By directly measuring plume meander with the optical gas detector 100, these embodiments can be used to infer atmospheric mixing parameters like stability and surface roughness as well as relevant turbulence and mixing timescales.

While FIGS. 3A and 4A illustrate measurement of the plume 312 meandering through the sector 302, the present embodiments that rely on such measurement of meandering plumes can also be applied to a subsector (e.g., one of the subsectors 210(1), 210(2), and 210(3) shown in FIG. 2) to at least partially determine the location of the emission source 308 between the two optical paths bounding the subsector.

Combinations of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A method for characterizing gas emission includes measuring a first optical beam to generate a first absorption signal. The first optical beam is transmitted from a geographic center point and retroreflected at a first retroreflection location. A first path of the first optical beam defining a first boundary of a sector. The method also includes measuring second optical beam to generate a second absorption signal. The second optical beam is transmitted from the geographic center point and retroreflected at a second retroreflection location. A second path of the second optical beam defining a second boundary of the sector. The method also includes determining, based on the first and second absorption signals, a sector emission rate of a gas species from within the sector. The method also includes, in response to the sector emission rate exceeding a threshold, measuring each intrasector optical beam of a plurality of intrasector optical beams to generate a respective one of a plurality of intrasector absorption signals. Each intrasector optical beam is transmitted from the geographic center point and retroreflected at a respective one of a plurality of intrasector retroreflection locations. A plurality of intrasector paths of the plurality of intrasector optical beams divide the sector into a plurality of subsectors. The method also includes, in response to the sector emission rate exceeding a threshold, determining a location of a source of the gas species within at least one of the plurality of subsectors. Said determining the location is based on the first absorption signal, the second absorption signal, and the intrasector absorption signal of each intrasector optical beam.

(A2) In the method denoted (A1), said determining the location includes determining a plurality of subsector emission rates for the plurality of subsectors and comparing the plurality of subsector emission rates.

(A3) In the method denoted (A2), said comparing includes ranking the plurality of subsectors, based on the plurality of subsector emission rates, in order of likelihood that each of the plurality of subsectors contains the source.

(A4) In the method denoted (A3), said determining the plurality of subsector emission rates includes applying an inversion to solve for emission points within the sector. Said ranking includes ranking by cumulative leak rate the emission points within each of the plurality of subsectors.

(A5) In the method denoted (A2), said determining the plurality of subsector emission rates includes sequentially determining the plurality of subsector emission rates. Said ranking includes ranking according to a residual between a model and data, the data being obtained from the from the first absorption signal, the second absorption signal, and the intrasector absorption signal of each intrasector optical beam.

(A6) In the method denoted (A2), said determining the plurality of subsector emission rates includes solving for the plurality of subsector emission rates and uncertainty distributions with assumed prior and measurement-noise distributions. Said ranking includes calculating, based on the resulting uncertainty distribution, a probability that each of the plurality of subsectors is leaking above a threshold.

(A7) In the method denoted (A2), said determining the plurality of subsector emission rates uses the Metropolis-Hastings method.

(A8) In any of the methods denoted (A1) to (A7), the method includes repeating said measuring the first absorption signal, said measuring the second absorption signal, said measuring the intrasector absorption signal, and said determining the location.

(A9) In the method denoted (A8), said repeating continues until the sector emission rate drops below the threshold.

(A10) In the method denoted (A9), said repeating continues for a fixed duration.

(A11) In any of the methods denoted (A1) to (A10), said determining the location of the source includes selecting a downwind path from the group consisting of the first path, the second path, and the plurality of intrasector paths; processing a downwind absorption signal of the downwind path to generate a concentration time series, the downwind absorption signal being selected from the group consisting of the first absorption signal, the second absorption signal, and the intrasector absorption signal of each intrasector beam; processing the concentration time series to obtain a measured variability; and determining, based on the measured variability, proximity of the source to the downwind path.

(A12) In the method denoted (A11), said selecting is based on wind data.

(A13) In either of the methods denoted (A11) and (A12), said processing the concentration time series includes calculating a Fourier transform of the concentration time series.

(A14) In any of the methods denoted (A11) to (A13), the method further includes selecting an upwind path, different from the downwind path, from the group consisting of the first path, the second path, and the plurality of intrasector paths. The method further includes determining, based on the measured variability, proximity of the source to the upwind path.

(B1) A method for characterizing gas emissions includes measuring a first optical beam to generate a first absorption signal. The first optical beam is transmitted from a geographic center point and retroreflected at a first retroreflection location. A first path of the first optical beam defining a first boundary of a sector. The method also includes measuring a second optical beam to generate a second absorption signal. The second optical beam is transmitted from the geographic center point and retroreflected at a second retroreflection location. A second path of the second optical beam defining a second boundary of the sector. The method also includes, in response to the sector emission rate exceeding a threshold, measuring a third optical beam to generate a third absorption signal. The third optical beam is transmitted from the geographic center point and retroreflected at a third retroreflection location. A third path of the third optical beam divides the sector into a first subsector and a second subsector. The method also includes, in response to the sector emission rate exceeding a threshold, determining, based on the first, second, and third absorption signals, a location of a source of the gas species as being within the first subsector or the second subsector.

(B2) In the method denoted (B1), said determining the location includes determining, based on the first and third absorption signals, a first subsector emission rate of the gas species from within the first subsector; determining, based on the second and third absorption signals, a second subsector emission rate of the gas species from within the second subsector; and comparing the first and second subsector emission rates.

(B3) In either of the methods denoted (B1) and (B2), the method further includes repeating said measuring the first absorption signal, said measuring the second absorption signal, said measuring the third absorption signal, and said determining the location.

(B4) In the method denoted (B3), said repeating continues until the sector emission rate drops below the threshold.

(B5) In the method denoted (B3), said repeating continues for a fixed duration.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for characterizing gas emissions, comprising:
    measuring a first optical beam to generate a first absorption signal, the first optical beam being transmitted from a geographic center point and retroreflected at a first retroreflection location, a first path of the first optical beam defining a first boundary of a sector;

measuring a second optical beam to generate a second absorption signal, the second optical beam being transmitted from the geographic center point and retroreflected at a second retroreflection location, a second path of the second optical beam defining a second boundary of the sector;

determining, based on the first and second absorption signals, a sector emission rate of a gas species from within the sector; and in response to the sector emission rate exceeding a threshold:

measuring each intrasector optical beam of a plurality of intrasector optical beams to generate a respective one of a plurality of intrasector absorption signals, each intrasector optical beam being transmitted from the geographic center point and retroreflected at a respective one of a plurality of intrasector retroreflection locations, a plurality of intrasector paths of the plurality of intrasector optical beams dividing the sector into a plurality of subsectors; and determining a location of a source of the gas species within at least one of the plurality of subsectors, said determining the location being based on the first absorption signal, the second absorption signal, and the intrasector absorption signal of each intrasector optical beam.

2. The method of claim 1, wherein said determining the location comprises:

determining a plurality of subsector emission rates for the plurality of subsectors; and comparing the plurality of subsector emission rates.

3. The method of claim 2, wherein said comparing comprises ranking the plurality of subsectors, based on the plurality of subsector emission rates, in order of likelihood that each of the plurality of subsectors contains the source.

4. The method of claim 3, wherein:

said determining the plurality of subsector emission rates comprises applying an inversion to solve for emission points within the sector; and said ranking comprises ranking by cumulative leak rate the emission points within each of the plurality of subsectors.

5. The method of claim 3, wherein:

said determining the plurality of subsector emission rates comprises sequentially determining the plurality of subsector emission rates; and said ranking comprises ranking according to a residual between a model and data, the data being obtained first absorption signal, the second absorption signal, and the intrasector absorption signal of each intrasector optical beam.

6. The method of claim 3, wherein:

said determining the plurality of subsector emission rates comprises solving for the plurality of subsector emission rates and posterior uncertainty distributions with assumed prior and measurement-noise distributions; and said ranking comprises calculating, based on the posterior uncertainty distributions, a probability that each of the plurality of subsectors is leaking above a threshold.

7. The method of claim 2, wherein said determining the plurality of subsector emission rates uses the Metropolis-Hastings method.

8. The method of claim 1, further comprising repeating said measuring the first optical beam, said measuring the second optical beam, said measuring each intrasector optical beam of the plurality of intrasector optical beams, and said determining the location.

9. The method of claim 8, wherein said repeating continues until the sector emission rate drops below the threshold.

10. The method of claim 8, wherein said repeating continues for a fixed duration.

11. The method of claim 1, wherein said determining the location of the source comprises:

selecting a downwind path from the group consisting of the first path, the second path, and the plurality of intrasector paths;

processing a downwind absorption signal of the downwind path to generate a concentration time series, the downwind absorption signal being selected from the group consisting of the first absorption signal, the second absorption signal, and the intrasector absorption signal of each intrasector beam;

processing the concentration time series to obtain a measured variability; and determining, based on the measured variability, proximity of the source to the downwind path.

12. The method of claim 11, wherein said selecting is based on wind data.

13. The method of claim 11, wherein said processing the concentration time series comprises calculating a Fourier transform of the concentration time series.

14. The method of claim 11, further comprising:

selecting an upwind path, different from the downwind path, from the group consisting of the first path, the second path, and the plurality of intrasector paths; and determining, based on the measured variability, proximity of the source to the upwind path.

15. A method for characterizing gas emissions, comprising:

measuring a first optical beam to generate a first absorption signal, the first optical beam being transmitted from a geographic center point and retroreflected at a first retroreflection location, a first path of the first optical beam defining a first boundary of a sector;

measuring a second optical beam to generate a second absorption signal, the second optical beam being transmitted from the geographic center point and retroreflected at a second retroreflection location, a second path of the second optical beam defining a second boundary of the sector;

determining, based on the first and second absorption signals, a sector emission rate of a gas species from within the sector; and in response to the sector emission rate exceeding a threshold:

measuring a third optical beam to generate a third absorption signal, the third optical beam being transmitted from the geographic center point and retroreflected at a third retroreflection location, a third path of the third optical beam dividing the sector into a first subsector and a second subsector; and determining, based on the first, second, and third absorption signals, a location of a source of the gas species as being within the first subsector or the second subsector.

16. The method of claim 15, wherein said determining the location comprises:

determining, based on the first and third absorption signals, a first subsector emission rate of the gas species from within the first subsector;

determining, based on the second and third absorption signals, a second subsector emission rate of the gas species from within the second subsector; and comparing the first and second subsector emission rates.

17. The method of claim 15, further comprising repeating said measuring the first optical beam, said measuring the second optical beam, said measuring the third optical beam, and said determining the location.

18. The method of claim 17, wherein said repeating continues until the sector emission rate drops below the threshold.

19. The method of claim 17, wherein said repeating continues for a fixed duration.

* * * * *